(No Model.)
A. A. LOW.
COMBINATION IMPLEMENT.
No. 419,268. Patented Jan. 14, 1890.
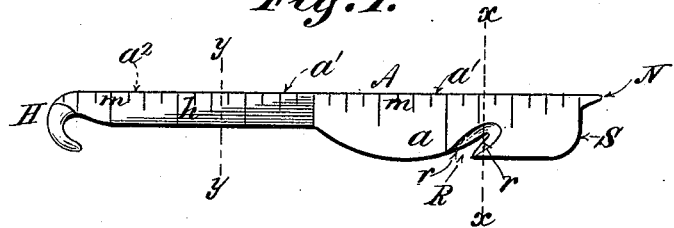
Fig. 1.
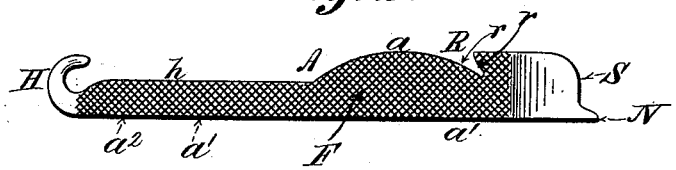
Fig. 2.
Fig. 3.
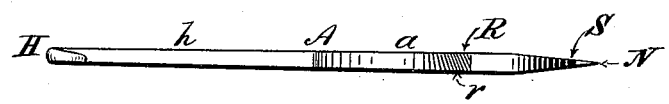
Fig. 4.
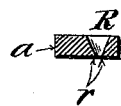 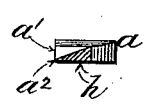
Fig. 5.    Fig. 6.
Witnesses:
D. W. Gardner
G. T. Miatt
Inventor:
Abbot Augustus Low
By his Attorney,
Geo. H. Miatt
N. PETERS, Photo-Lithographer, Washington, D. C.

UNITED STATES PATENT OFFICE.

ABBOT AUGUSTUS LOW, OF BROOKLYN, NEW YORK.

COMBINATION IMPLEMENT.

SPECIFICATION forming part of Letters Patent No. 419,268, dated January 14, 1890.

Application filed December 13, 1888. Serial No. 293,514. (No model.)

*To all whom it may concern:*

Be it known that I, ABBOT AUGUSTUS LOW, a citizen of the United States, residing in the city of Brooklyn, in the county of Kings and State of New York, have invented certain new and useful Improvements in Combination Implements, of which the following is a specification sufficient to enable others skilled in the art to which the invention appertains to make and use the same.

The object of my invention is the production of a simple, compact, and durable implement, constructed of a single rigid piece of metal without movable parts, and adapted to a variety of common uses and requirements—a device adapted especially for use as a handy combination-tool to be carried in the pocket.

My invention consists of a piece of metal so shaped and constructed that it may be used either as a hook, envelope or paper cutter, cord-cutter, measure, rule, straight-edge, finger-nail cleaner, file, or screw-driver. Obviously, some of these functions may be unprovided for in the implement without affecting its utility in regard to the remaining functions, and I therefore do not wish to limit myself to an implement embodying all the features enumerated.

In the accompanying drawings, Figure 1 is an elevation of what may be called the "upper side" of my combination implement; Fig. 2, an elevation of the reverse or lower side; Fig. 3, an elevation of the front edge; Fig. 4, a similar view of the rear edge; Fig. 5, a transverse section upon plane of line $x\ x$, Fig. 1; Fig. 6, a transverse section upon plane of line $y\ y$, Fig. 1. Fig. 7 shows a modified form of the implement.

The implement A is formed from a blank of suitable metal. At one extremity it is formed with a hook H, adapted for use as a button-fastener, lace-tightener, or any of the analogous uses to which such devices are applied. The other extremity of the implement is chamfered off to form an edge S, adapted to engage the nicks in screw-heads, so that the implement may be used as a screw-driver, or as a screw-holder in cases in which the nut may be tightened upon the screw. This end of the implement is also formed with a finger-nail cleaner N, projecting outward a short distance beyond the screw-engaging edge S.

The screw edge S and nail-cleaner N are situated at the lower end of what may be designated as the handle $a$ of the implement, this part of the latter being preferably thicker and wider than the shank $h$ of the hook H.

The front edge $a'$ of the implement is straight, and its under side is flat, so that it may be conveniently used as a straight-edge for severing paper evenly by tearing, as for checks, &c., or as a ruling-edge for marking, &c.

The implement is formed with a measuring-scale $m$, immediately adjoining the front straight-edge $a'$, its uses in conjunction therewith being obvious.

The portion $h$ of the implement corresponding to the shank of the hook H is beveled to an edge at front, as shown in Fig. 6, constituting a cutter $a^2$, adapted to the opening of letter-envelopes and other paper-wrappers, as well as for use as a paper-cutter generally.

The under side of the implement is cross-cut or otherwise suitably roughened to form a file F for finger-nails, &c. The roughened surface F also tends to hold the implement more firmly in position when it is used as a straight-edge or rule.

The body of the implement is formed with a recess R, preferably inclined with relation to its length and having its inner edges $r$ sharpened to constitute a cord-cutter. The cutting-edges, which preferably do not extend to the mouth of the recess R, are made to converge, so that the cord will be gradually severed as it is forced to the bottom of the recess.

The pocket implement thus produced is available in innumerable circumstances of daily occurrence, besides affording convenient and effective means for performing the functions specified. Being made of a single piece of metal, it is strong, durable, cheap to manufacture, and cannot possibly get out of order by ordinary and legitimate use.

What I claim as my invention, and desire to secure by Letters Patent, is—

1. A combined implement consisting of a single piece of metal formed into the hook H, shank $h$, handle $a$, and straight-edge $a'$, for the purpose and substantially in the manner described.

2. A combined implement consisting of a single piece of metal formed with the handle $a$, hook H, and intervening shank $h$, the back of which shank is formed with the straight paper-cutting edge $a^2$, substantially in the manner and for the purpose described.

3. A combined implement consisting of a single piece of metal formed into the hook H, shank $h$, handle $a$, and screw-driver S, for the purpose and substantially in the manner described.

4. A combined implement consisting of a single piece of metal formed into the hook H, shank $h$, handle $a$, and finger-nail cleaner N, substantially in the manner and for the purpose described.

5. A combined implement consisting of a single piece of metal formed into the hook H, shank $h$, handle $a$, straight-edge $a'$, and measuring-scale $m$, for the purpose and substantially in the manner described.

6. A combined implement consisting of a single piece of metal formed into the hook H, shank $h$, handle $a$, and the cord-cutter R, the latter being formed directly in the handle $a$, for the purpose and substantially in the manner described.

7. A combined implement consisting of a single piece of metal formed into the hook H, shank $h$, handle $a$, and file F, for the purpose and substantially in the manner described.

8. A combined implement consisting of a single piece of metal formed into the hook H, shank $h$, handle $a$, screw-driver S, finger-nail cleaner N, cord-cutter R, straight-edge $a'$, measure $m$, cutter $a^2$, and file F, for the purpose and substantially in the manner described.

ABBOT AUGUSTUS LOW.

Witnesses:
GEO. W. MIATT,
D. W. GARDNER.